United States Patent [19]

Shoji et al.

[11] Patent Number: 5,087,157
[45] Date of Patent: Feb. 11, 1992

[54] ELECTROMAGNETIC BASE DRILL WITH INTERMITTENT FEED

[75] Inventors: Michihiro Shoji; Osamu Asano, both of Tokyo, Japan

[73] Assignee: Nitto Kohki Co., Ltd., Tokyo, Japan

[21] Appl. No.: 644,525

[22] Filed: Jan. 23, 1991

[30] Foreign Application Priority Data

Jan. 26, 1990 [JP] Japan ................... 2-16328

[51] Int. Cl.⁵ ............................................. B23Q 15/013
[52] U.S. Cl. ................................... 408/9; 318/39; 408/10; 408/17; 408/76
[58] Field of Search ............. 408/9, 11, 17, 76, 8, 408/10, 12; 318/269, 273, 811, 39, 571; 388/811, 815, 819, 822, 937

[56] References Cited

U.S. PATENT DOCUMENTS 4,559,577 12/1985 Shoji et al. ............... 408/9 X
4,780,654 10/1988 Shoji et al. ............... 318/39 X

FOREIGN PATENT DOCUMENTS 131807 6/1986 Japan ...................... 408/17

Primary Examiner—Steven C. Bishop
Attorney, Agent, or Firm—Nixon & Vanderhye

[57] ABSTRACT

The states of contact switches are switched when a mode switch is turned on. If the drilling operation is effected by means of a drill motor in this state, an oscillation signal which is repeatedly set to "H" and "L" in a preset period corresponding to an output of an oscillator is supplied to the control terminal of a firing pulse generator. The firing pulse generator interrupts supply of the control signal to the control terminal of a triac in the above preset period based on the oscillation signal supplied to the control terminal thereof to interrupt supply of an AC power source from a commercial AC power source to a bridge-type rectifier so as to intermittently drive a feed motor which is energized by an output of the rectifier in the above preset period. As a result, the drill motor can be intermittently fed towards a to-be-worked object by means of the feed motor, and, when the feeding operation is interrupted, a cutting operation can be instantaneously stopped and swarf can be cut apart.

6 Claims, 4 Drawing Sheets

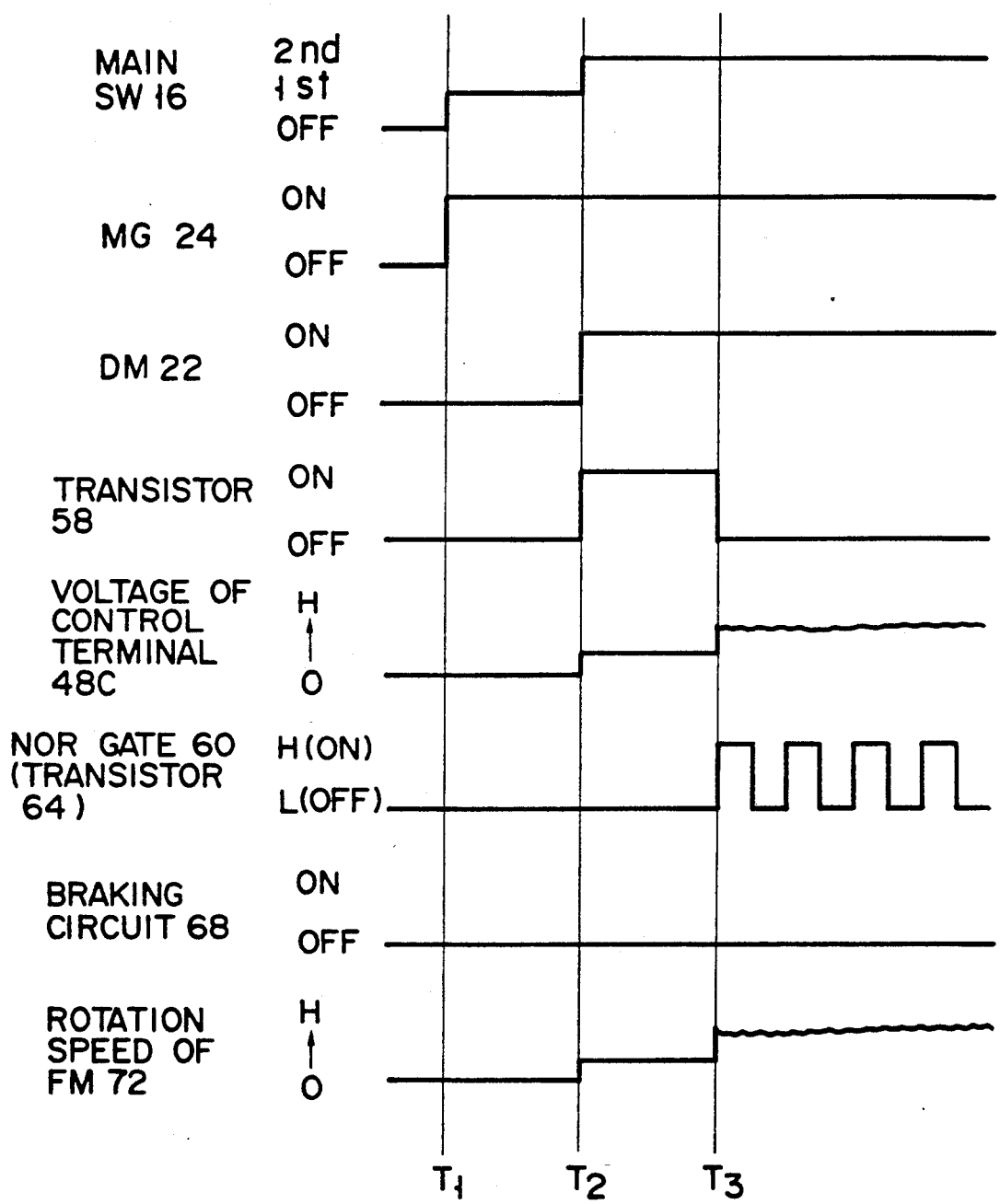
F I G. 3

5,087,157

ELECTROMAGNETIC BASE DRILL WITH INTERMITTENT FEED

BACKGROUND OF THE INVENTION

1. Field of the Invention

This invention relates to a drill device or tool with an electromagnetic base, and more particularly to a drill device with an electromagnetic base in which swarf is difficult to cling to the cutter (annular cutter, drill or the like) mounted on the front end of the drill device.

2. Description of the Related Art

Conventionally, there has been proposed a drill device with an electromagnetic base having an electromagnet for attaching the drill device on a to-be-worked object (or workpiece) and a feed motor for automatically feeding the drill device towards the object. For example, the inventors of this invention invented a drill device with an electromagnetic base in which the rotation speed of the feeding motor for feeding the drill towards the object is lowered to lower the feeding speed when the load of the drill motor for rotating the drill is large and the rotation speed of the feeding motor is increased to increase the feeding speed when the load of the drill motor is small and filed an application (Application No. 540,197) at the U.S. PTO on June 19, 1990.

Thus, the operation of drilling the object can be efficiently effected without applying a heavy load on the drill or the object by controlling the load condition of the drill device or the feed speed according to the cutting condition.

That is, in the drill device with an electromagnetic base, the feed speed is controlled according to the magnitude of the load in the cutting operation so that the drill or annular cutter will be less subject to damage.

However, in a case where a thick object is drilled, it becomes difficult to remove swarf and therefore a heavy load tends to be applied to the drill or annular cutter. Therefore, some measures must be taken to easily remove the swarf.

SUMMARY OF THE INVENTION

This invention has been made to solve the above problems and an object of this invention is to provide a drill device with an electromagnetic base capable of easily removing swarf even in a case where a thick object is worked.

The above object can be attained by a drill device with an electromagnetic base comprising a drill motor; a feed motor for feeding the drill motor towards a to-beworked object; an electromagnet for attaching the drill device to the to-be-worked object; an oscillator for repeatedly generating outputs of "H" and "L" in a preset period; and energization controlling means for intermittently energizing the feed motor according to an output of the oscillator when the drill motor is driven to effect a working operation.

This invention has a feature that the feed motor is intermittently and periodically energized after the drill device has started the cutting or drilling operation (or working operation). Therefore, the drill or annular cutter can be intermittently moved towards the to-beworked object.

Further, it also has a feature that short-circuit occurs between the power source terminals to brake the feed motor when energization of the feed motor is interrupted while the feed motor is intermittently energized. Therefore, a counter-electromotive force generated in the feed motor can be instantaneously consumed.

Further, it has a feature that the speed at which the drill or annular cutter is lowered is reduced immediately before the drill device starts the cutting operation.

Further, it has a feature that the feed motor is intermittently energized such that the energization voltage at the time of re-starting the feed motor is set higher than the normal continuously feeding voltage. Therefore, the rotation speed of the motor is rapidly increased at the time of re-starting the feed motor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a timing chart for explaining the operation of the embodiment of the drill device with an electromagnetic base of this invention effected when a mode switch shown in Fig. 2 is turned off; and FIG. 4 is a timing chart for explaining the operation of the embodiment of the drill device with an electromagnetic base of this invention effected when a mode switch shown in Fig. 2 is turned on.

DETAILED DESCRIPTION OF THE PREFERRED EMBODIMENTS

There will now be described an embodiment of this invention with reference to the accompanying drawings.

Figure 1:
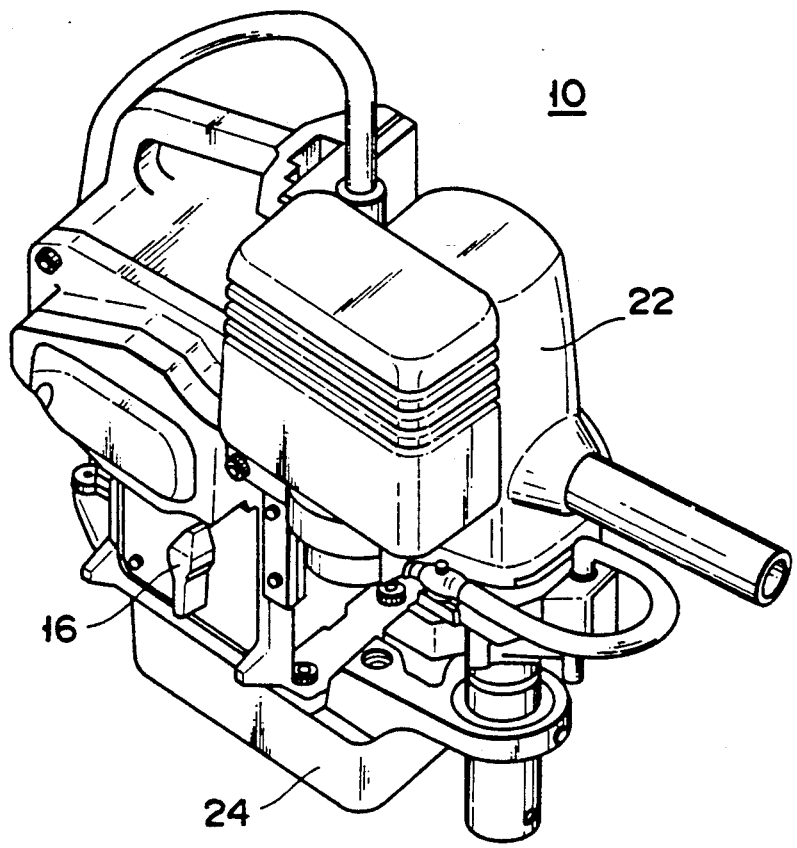
FIG. 1 is a perspective view showing an appearance of one embodiment of a drill device with an electromagnetic base of this invention.
Figure 2:
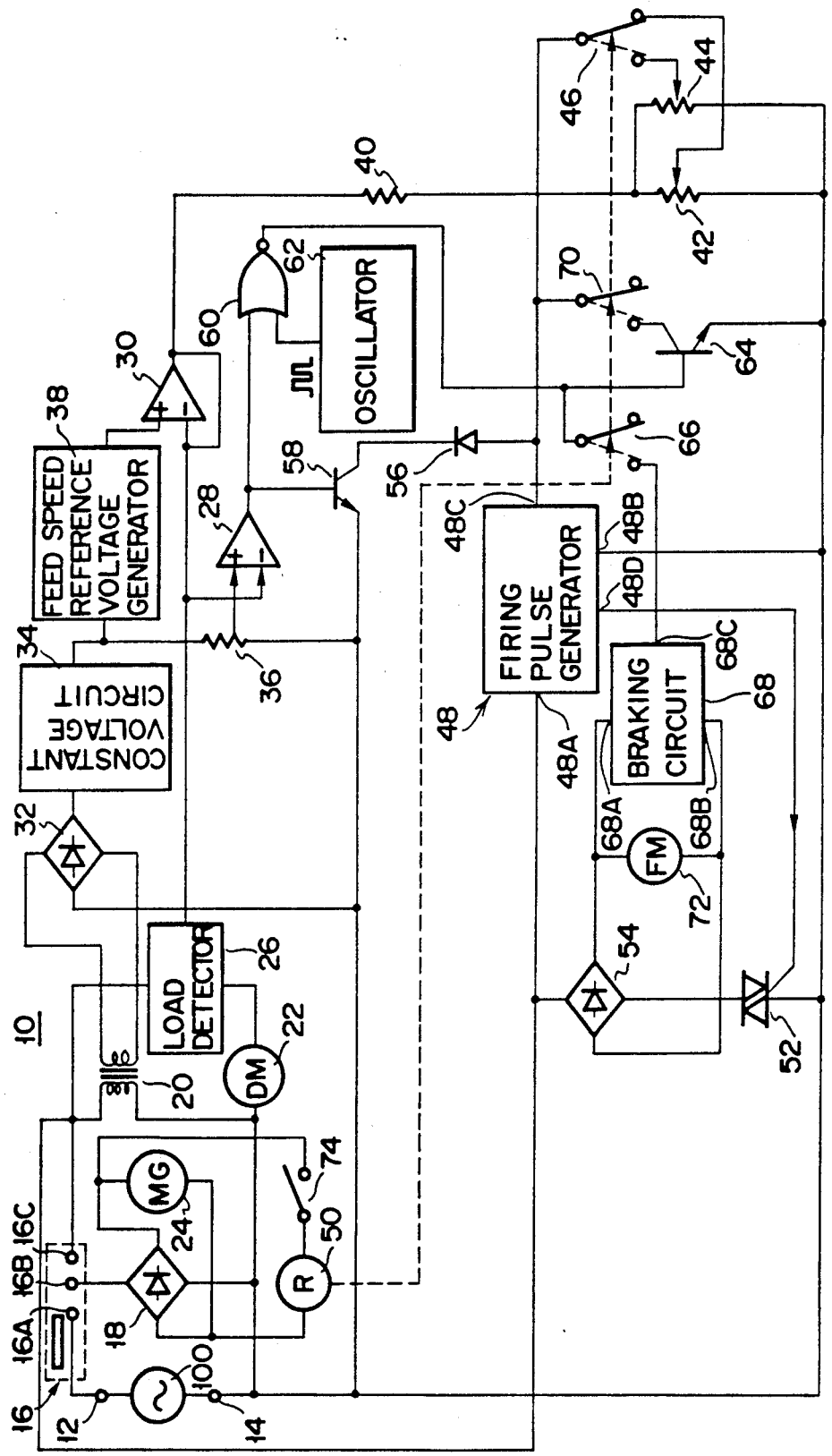
FIG. 2 is a block diagram of the embodiment of the drill device with an electromagnetic base of this invention.

The accompanying drawings show one embodiment of this invention, and Fig. 1 is an external perspective view of the embodiment from which a cutter is omitted and FIG. 2 is a block diagram showing the construction thereof.

Input terminals 12 and 14 of the drill device 10 with an electromagnetic base are connected to a commercial AC power source 100.

A main switch 16 connects the paired input terminals of a bridge-type rectifier 18 to the commercial AC power source 100 when it is set into a first-stage operation position and further connects the primary terminals of a transformer 20 and a drill motor (DM) 22 to the commercial AC power source 100 when it is set into a second-stage operation position. That is, the main switch 16 has terminals 16A, 16B and 16C, and the terminals 16A and 16B are connected together when it is set into the first-stage operation position and the terminals 16A, 16B and 16C are connected together when it is set into the second-stage operation position.

The drill motor 22 is an AC motor for driving a drill or an annular cutter (not shown).

An electromagnet (MG) 24 of the drill device 10 with the electromagnetic base is connected to the paired output terminals of the bridge-type rectifier 18. That is, when the main switch 16 is set into the first-stage operation position, the electromagnet 24 is energized to attract and attach the drill device 10 with the electromagnetic base to a to-be-worked object (not shown).

The value of current flowing in the drill motor 22 energized subsequent to energization of the electromagnet 24 by setting the main switch 16 into the seconds-tage operation position or the load of the drill motor 22 is detected by a load detector 26. The load detector 26 generates a voltage which becomes higher as the current flowing in the drill motor 22 becomes larger. An output signal from the load detector 26 is supplied to inverted input terminals of a comparator 28 and a differential amplifier 30 which will be described later.

The secondary terminals of the transformer 20 are connected to the paired input terminals of a bridge-type rectifier 32. One of paired output terminals of the bridge-type rectifier 32 is connected to a constant voltage circuit 34 and the other output terminal thereof is connected to the input terminal 14.

A preset constant voltage signal output from the constant voltage circuit 34 is supplied to one end of a resistor 36 and to a feed speed reference voltage generator 38. The other end of the resistor 36 is connected to the input terminal 14.

An output terminal of the feed speed reference voltage generator 38 is connected to a non-inverting input terminal of the differential amplifier 30. A voltage output from the generator 38 is set to a value which is larger than the maximum value of output voltages which can be output from the load detector 26.

An output signal of the differential amplifier 30 is equal to an output obtained by subtracting the output signal of the load detector 26 from the output signal of the feed speed reference voltage generator 38. Therefore, the output signal of the differential amplifier 30 becomes small when the current flowing in the drill motor 22 is large (when the load of the drill motor 22 is large), and in contrast, it becomes large when the current flowing in the drill motor 22 is small (when the load of the drill motor 22 is small).

An output signal line of the differential amplifier 30 is connected to one-side ends of resistors 42 and 44 via a resistor 40. The other ends of the resistors 42 and 44 are connected to the input terminal 14.

A voltage divided by the resistors 42 and 44 is applied to the control terminal 48C of a firing pulse generator 48 via a contact switch 46. The contact switch 46 is controlled by a relay (R) 50 which will be described later. That is, the contact switch 46 normally functions to apply a voltage divided by the resistor 42 to the control terminal 48C and acts to apply a voltage divided by the resistor 44 to the control terminal 48C when the relay 50 is operated.

The resistances of the resistors 42 and 44 are set so that the divided voltage by the resistor 44 may become higher than the divided voltage by the resistor 42.

A power source terminal 48A of the firing pulse generator 48 is connected to the input terminal 12 via the main switch 16 and a power source terminal 48B thereof is connected to the input terminal 14. The firing pulse generator 48 is triggered in response to supply of power source voltages to the power source terminals 48A and 48B and outputs a control signal from the output terminal 48D according to a voltage applied to the control terminal 48C. A triac 52 is controlled by the control signal and the output current of the commercial AC power source 100 supplied to a bridge-type rectifier 54 is subjected to a firing angle controlling operation. Supply of power source voltages to the power source terminals 48A and 48B can be effected by setting the main switch 16 to the second-stage operation position.

The control terminal 48C is connected to the collector of a transistor 58 via a diode 56. The emitter and base of the transistor 58 are respectively connected to the input terminal 14 and the output terminal of the comparator 28.

The non-inverting input terminal of the comparator 28 is supplied with a voltage derived by dividing the output voltage of the constant voltage circuit 34 by the resistor 36.

One of paired input terminals of a NOR gate 60 is connected to an output terminal of the comparator 28 and the other input terminal is connected to an output terminal of an oscillator 62. The oscillator 62 outputs rectangular pulses of "H" and "L" in a period of 1 second, for example.

An output terminal of the NOR gate 60 is connected to the base of a transistor 64 and to a control terminal 68C of a braking circuit 68 via a contact switch 66.

Like the contact switch 46, the contact switch 66 is controlled by the relay 50 which will be described later. That is, the contact switch 66 connects the output terminal of the NOR gate 60 and the control terminal 68C of the braking circuit 68 to each other only when the relay 50 is energized.

Further, the collector of the transistor 64 is connected to the control terminal 48C of the firing pulse generator 48 via a contact switch 70 and the emitter of the transistor 64 is connected to the input terminal 14. Like the contact switches 46 and 66, the contact switch 70 is controlled by the relay 50 which will be described later. The contact switch 70 connects the collector of the transistor 64 and the control terminal 48C of the firing pulse generator 48 to each other only when the relay 50 is energized.

One of the input terminals of the bridge-type rectifier 54 is connected to the input terminal 14 via the triac 52 and the other input terminal thereof is connected to the terminal 16C of the main switch 16. Therefore, the rectifier 54 and the triac 52 are connected to the commercial AC power source 100 by setting the main switch 16 into the second-stage operation position.

A feed motor (FM) 72 for feeding a drill or annular cutter (not shown) together with the drill motor 22 towards the to-be-worked object is connected to the paired output terminals of the bridge-type rectifier 54. The feed motor 72 is a DC motor.

The control terminal of the triac 52 is connected to the output terminal 48D of the firing pulse generator 48. As described before, an AC current supplied from the commercial AC power source 100 to the bridge-type rectifier 54 is subjected to a firing angle controlling operation by the controlling operation of the triac 52, and as a result, the rotation speed of the feed motor 72 is controlled. More specifically, in a case where contact switch 46 selects the resistor 42, the feed motor 72 rotates at a high speed when the load of the drill motor 22 is small and at a low speed when the load of the drill motor 22 is large.

The braking circuit 68 is connected in parallel with the feed motor 72. The braking circuit 68 directly connects the paired terminals 68A and 68B to each other when the input signal to the control terminal 68C becomes "H". That is, short-circuit occurs between the paired power source terminals of the feed motor 72.

A mode switch 74 and the relay 50 which are serially connected are connected to the paired output terminals of the bridge-type rectifier 18 in parallel with the electromagnet 24. The mode switch 74 is a switch for selectively setting a mode to determine whether the characteristic operation of this invention is effected or not, and the intermittent feeding operation of the drill device with the electromagnetic base 10 is effected by turning on the mode switch 74. When the mode switch 74 is not turned on, the feeding operation of the drill device 10 is continuously effected.

Next, the operation of the embodiment with the above construction is explained. Assume that the drill motor 22 is set in the uppermost position when the drill device 10 with the electromagnetic base is attached to the to-be-worked object (not shown) (FIG. 1 shows a case wherein the drill motor 22 is set in the lowest position although none of the drill and annular cutter are shown).

First, a case wherein the mode switch 74 is not turned on is explained with reference to the timing chart of FIG. 3.

At time $T_1$, the drill device 10 with the electromagnetic base is arranged in a preset position on the to-be-worked object and the main switch (SW) 16 is set to the first-stage operation position. As a result, the electromagnet (MG) 24 is energized and the drill device 10 with the electromagnetic base is attracted to the object and fixed thereon.

Since the mode switch 74 is not turned on at this time, the contact switches 46, 66 and 70 are set in the connection state as shown in Fig. 2.

Next, at time $T_2$, the main switch 16 is set into the second-stage operation position to energize the drill motor (DM) 22, transformer 20 and feed motor (FM) 72. However, the feed motor 72 does not feed the drill since rotation of the feed motor 72 is not transmitted to a drill lifting device (not shown) until a clutch (not shown) is operated, and when the lifting device is operated, the drill or annular cutter is moved to gradually close to the object.

As described before, an output signal of the operation amplifier 30 becomes small when the load of the drill motor 22 is large, and in contrast, it becomes large when the load of the drill motor 22 is small. As a result, a voltage applied to the control terminal 48C of the firing pulse generator 48, that is, a voltage divided by the resistor 42 varies with the load of the drill motor 22.

Since the firing pulse generator 48 is controlled according to a signal supplied to the control terminal 48C, the rotation speed of the feed motor 72 becomes low and the falling speed of the drill device becomes low when the load of the drill motor 22 is relatively large, and in contrast, the rotation speed of the feed motor 72 becomes high and the falling speed of the drill device becomes high when the load of the drill motor 22 is relatively small.

Since the drill or annular cutter mounted on the rotation shaft of the drill motor 22 is not yet set in contact with the object when the main switch 16 is turned on, the load of the drill motor 22 is extremely small and an output voltage of the load detector 26 is lower than a voltage divided by the resistor 36.

As a result, an output signal of the comparator 28 is set at "H" until the drill device 10 starts the cutting operation, thereby turning on the transistor 58 so that the potential of the control terminal 48C of the firing pulse generator 48 will be lowered to a voltage equal to the forward voltage drop of the diode 56. That is, the rotation speed of the feed motor 72 is low until the drill or annular cutter comes into contact with the object, and therefore the feeding speed becomes low (slow start).

At time $T_3$, the drill device 10 starts the cutting operation, the transistor 58 is turned off, and the feed motor 72 is controlled according to a potential divided by the resistor 42 or an output signal supplied from the differential amplifier 30 according to the load of the drill motor 22.

In a case where the mode switch 74 is not turned on, the contact switches 66 and 70 are set in the off state so that an output signal of the NOR gate 60 will not affect the other circuit, for example, braking circuit 68.

Figure 4:
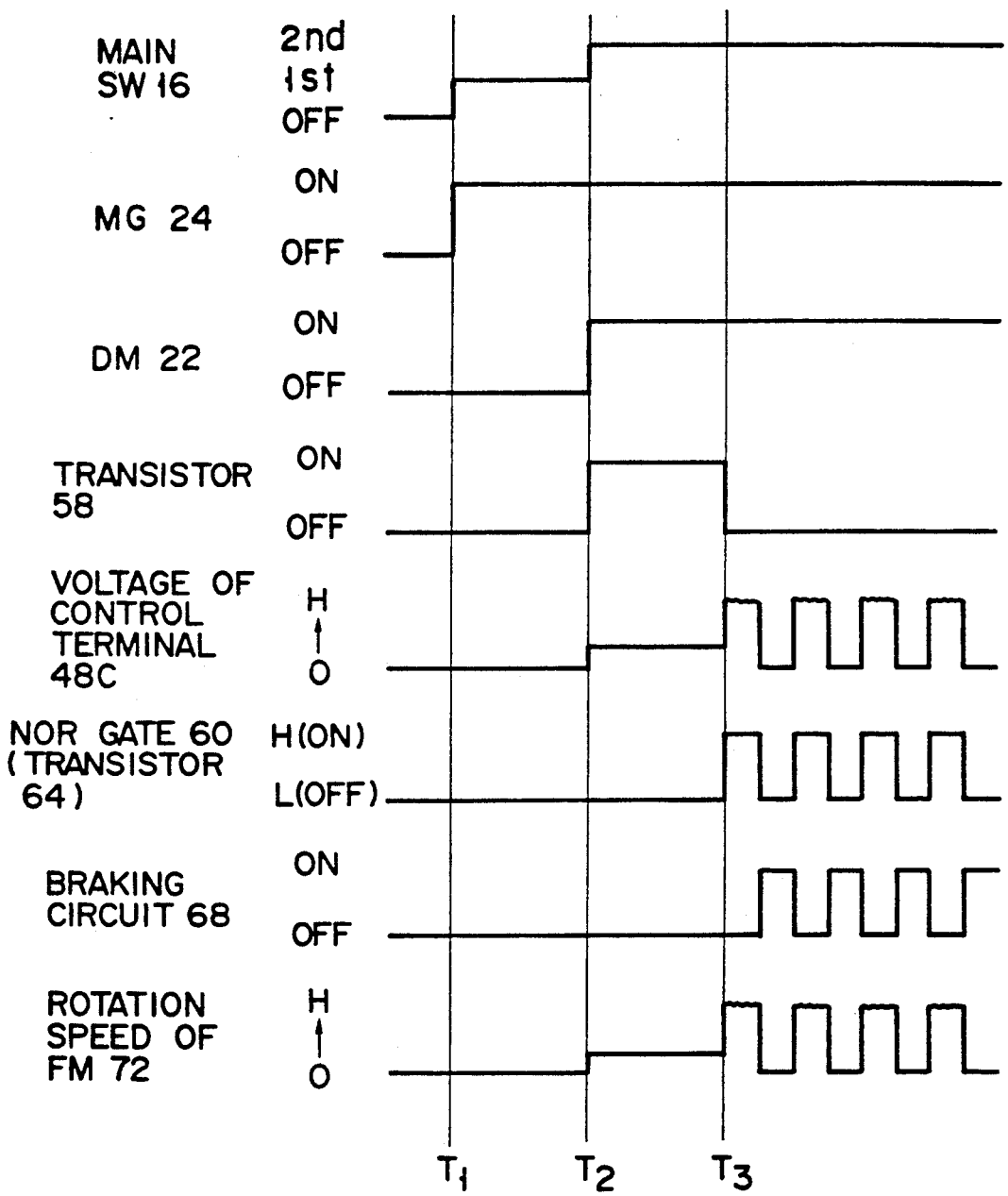

Next, an operation effected when the mode switch 74 is turned on is explained with reference to the timing chart of FIG. 4. When the mode switch 74 is turned on, the states of the contact switches 46, 66 and 70 are changed as shown by broken lines by means of the relay 50.

Also, in this case, the transistor 58 is kept on until time $T_3$ at which the drill device 10 starts the cutting operation, thereby lowering the voltage applied to the control terminal 48C of the firing pulse generator 48. That is, a slow starting operation is effected.

Since an output of the comparator 28 is set at "H" before time $T_3$ at which the drill device 10 starts the cutting operation, an output of the NOR gate 60 is set at "L" irrespective of an output signal of the oscillator 62. Therefore, the transistor 64 and braking circuit 68 will not be operated.

After the drill device 10 has started the cutting operation, the transistor 58 is turned off and a voltage divided by the resistor 44 is selected and applied to the control terminal 48C of the firing pulse generator 48.

At the cutting operation start time $T_3$, an output signal of the comparator 28 is set to "L", and therefore an output signal of the oscillator 62 is output from the NOR gate 60 as it is. As a result, the transistor 64 is repeatedly turned on and off in a period of 1 second and the voltage of the control terminal 48C of the firing pulse generator 48 is set to the potential of "0" in the same period. That is, after the drill device 10 has started the cutting operation, supply of the control signal to the control terminal of the triac 52 is interrupted in the above-described period and energization of the feed motor 72 is intermittently effected.

Further, the braking circuit 68 is started at the same timing and in the same period as the transistor 64 is turned on and off, and short-circuit occurs between the paired power source terminals of the feed motor 72 at the same timing and in the same period.

That is, when the transistor 64 is turned on to set the potential of the control terminal 48C of the firing pulse generator 48 to "0" and an output of the output terminal 4BD is interrupted to stop energization of the feed motor 72, the braking circuit 68 is started and short-circuit occurs between the paired power source terminals of the feed motor 72. Occurrence of the short-circuit permits the counter-electromotive force generated by the feed motor 72 to be instantaneously consumed, thereby instantaneously stopping the rotation of the feed motor 72.

Further, when the transistor 64 is turned off and energization of the feed motor 72 is started again, the operation of the braking circuit 68 is interrupted so that an output voltage of the bridge-type rectifier 54 can be supplied to the feed motor 72 as it is.

In this way, after the cutting operation, the operation of the feed motor 72 is intermittently effected. When the rotation of the feed motor 72 is interrupted, the cutting operation is instantaneously (or temporarily) stopped so that the swarf is cut off, thereby preventing formation of long swarf which will cling to the drill or annular cutter.

As described before, since the voltage divided by the resistor 44 is higher than the voltage divided by the resistor 42, the rotation speed of the feed motor 72 can be rapidly increased when energization of the feed motor 72 is started, thus permitting the intermittent feeding operation to be rapidly effected. In a case where an AC motor is used as the feed motor, the rotation speed can be changed by changing the frequency of the power source.

Further, the voltage divided by the resistor 44 may be determined according to an output of the differential amplifier 30 or according to the load of the drill motor 22. That is, when the load of the drill motor 22 is large, the falling speed of the drill device becomes low, and in contrast, when the load of the drill motor 22 is small, the falling speed of the drill device becomes high. As a result, the cutting operation by means of the drill device 10 with the electromagnetic base can be efficiently effected.

In the above explanation, the intermittent feeding operation and the continuous feeding operation of the feed motor 72 can be selectively effected by changing the switching position of the mode switch 74. The continuous feeding operation may be selected when a relatively thin object which will not cause swarf to cling to the drill or the like is drilled, but when a thick object is drilled, the intermittent feeding operation is selected.

It is also possible to omit the mode switch 74 and limit the feeding operation of the feed motor 72 to the intermittent feeding operation.

Although not shown in Fig. 2, it is also possible to invert the polarity of a voltage applied to the input terminal of the feed motor 72 so as to reversely rotate the feed motor 72, that is, raise the drill device after the operation of cutting the object is completed. The construction for effecting this operation is disclosed in, for example, U.S. patent application No. 540,197.

Further, it is possible to provide a safety circuit which interrupts the operation of the feed motor 72 when the load of the drill motor 22 becomes excessively large or a voltage supplied to the feed motor 72 becomes excessively high. Such a circuit is also disclosed in U.S. patent application No. 540,197.

As is clearly understood from the above description, the following effects can be attained according to this invention.

(1) Since the drill device 10 can be intermittently moved to the object by intermittently energizing the feed motor 72 according to an output of the oscillator 62 when the drilling operation is effected by use of the drill motor 22, swarf can be prevented from clinging to the front end portion of the drill or annular cutter, and, even if swarf is attached thereto, it can be easily removed because the length of swarf is short.

(2) While the feed motor 72 is intermittently energized by causing short-circuit between the power source terminals of the feed motor 72 when energization of the feed motor 72 is interrupted, a counter-electromotive force generated in the feed motor 72 can be instantaneously consumed when energization of the feed motor 72 is interrupted. As a result, a braking force is applied to the feed motor 72 to instantaneously stop the feed motor when energization of the feed motor 72 is interrupted, thereby making it possible to more effectively remove the swarf.

(3) Since the falling speed of the is lowered before the drill device 10 starts the cutting operation by lowering a voltage supplied to the feed motor 72 in the no load state before the working operation by the drill motor 22 is started, the cutting edge portion of the drill, annular cutter or the like can be prevented from being abruptly set into contact with the object and the cutting operation can be slowly started, thereby protecting the cutting edge from damages.

(4) Since a relatively high voltage is supplied to the feed motor 72 while the feed motor 72 is intermittently energized by setting the rotation speed higher at the time of re-starting the feed motor 72 in the intermittent energizing operation of the feed motor 72 than in the normal continuous energizing operation, the rotation speed of the feed motor 72 can be rapidly raised at the energization starting time. As a result, the cutting efficiency will not be lowered even when the feed motor 72 is intermittently driven.

Additional advantages and modifications will readily occur to those skilled in the art. Therefore, the invention in its broader aspects is not limited to the specific details, representative devices, shown and described herein. Accordingly, various modifications may be made without departing from the spirit or scope of the general inventive concept as defined by the appended claims and their equivalents.

We claim:

1. A drill device comprising:
   a drill motor for driving a drill;
   a feed motor for feeding said drill motor and said drill towards a workpiece;
   an electromagnetic base including an electromagnet for attaching said drill device to said workpiece;
   an oscillator for repeatedly generating outputs of "H" and "L" in a preset period;
   energization controlling means for intermittently energizing said feed motor according to an output of said oscillator when said drill motor is driven to effect a working operation; and
   braking means for causing a short-circuit between power source terminals of said feed motor when energization of said feed motor is interrupted.

2. A drill device with an electromagnetic base according to claim 1, further comprising voltage lowering means for lowering a voltage supplied to said feed motor in a no load state before said drill motor starts the working operation.

3. A drill device with an electromagnetic base according to claim 1, further comprising means for causing an intermittent energization of said feed motor to be effected by said energization controlling means so that a rotation speed of said feed motor can be set higher in a re-starting operation of said feed motor than in a normal continuous energization operation.

4. A drill device with an electromagnetic base according to claim 1 further comprising voltage lowering means for lowering a voltage supplied to said feed motor in a no load state before said drill motor starts the working operation.

5. A drill device with an electromagnetic base according to claim 1, further comprising means for causing an intermittent energization of said feed motor to be effected by said energization controlling means so that a rotation speed of said feed motor can be set higher in a re-starting operation of said feed motor than in a normal continuous energization operation.

6. A drill device with an electromagnetic base according to claim 2, further comprising means for causing an intermittent energization of said feed motor to be effected by said energization controlling means so that a rotation speed of said feed motor can be set higher in a re-starting operation of said feed motor than in a normal continuous energization operation.

* * * * *